United States Patent
Fujita et al.

(10) Patent No.: US 10,755,672 B2
(45) Date of Patent: Aug. 25, 2020

(54) PLAYBACK DEVICE

(71) Applicant: Funai Electric Co., Ltd., Daito, Osaka (JP)

(72) Inventors: Yoshikazu Fujita, Osaka (JP); Mitsuru Kawakita, Osaka (JP); Takuya Suzuki, Tokyo (JP); Shigeru Toji, Osaka (JP); Makoto Imagawa, Nishinomiya (JP); Sho Magara, Moriguchi (JP); Tatsuo Miyagawa, Kawanishi (JP); Yosuke Sonoda, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 0 days.

(21) Appl. No.: 16/266,524

(22) Filed: Feb. 4, 2019

(65) Prior Publication Data
US 2019/0244584 A1 Aug. 8, 2019

(30) Foreign Application Priority Data

Feb. 6, 2018 (JP) .................................. 2018-019058

(51) Int. Cl.
*G09G 5/04* (2006.01)
*H04N 21/4363* (2011.01)
(Continued)

(52) U.S. Cl.
CPC .............. *G09G 5/04* (2013.01); *G09G 5/026* (2013.01); *G09G 5/10* (2013.01);
(Continued)

(58) Field of Classification Search
CPC ... G09G 2320/0242; G09G 2320/0626; G09G 2370/042; G09G 5/026; G09G 5/04;
(Continued)

(56) References Cited

U.S. PATENT DOCUMENTS

| | | | |
|---|---|---|---|
| 2009/0033668 A1* | 2/2009 | Pederson | G06F 3/14 345/520 |
| 2015/0245043 A1* | 8/2015 | Greenebaum | H04N 5/2355 375/240.25 |
| 2015/0256879 A1* | 9/2015 | Hasegawa | H04N 5/76 386/230 |
| 2016/0142647 A1 | 5/2016 | Gopinath et al. | |

(Continued)

FOREIGN PATENT DOCUMENTS

| | | |
|---|---|---|
| EP | 1 775 726 A1 | 4/2007 |
| JP | 2017-60084 A | 3/2017 |

(Continued)

OTHER PUBLICATIONS

The extended European Search Report of the European Application No. 19155523.4, dated Jun. 18, 2019.

*Primary Examiner* — Richard J Hong
(74) *Attorney, Agent, or Firm* — Global IP Counsels, LLP

(57) ABSTRACT

A playback device is configured to be connected to a display device. The playback device includes a communication component and a controller. The communication component communicates with the display device. The controller acquires setting information indicating a current setting of a brightness range in the display device from the display device via the communication component. While a specific brightness range has not been set in the display device, the controller transmits information related to a setting change to the specific brightness range via the communication component to the display device based on correspondence information indicating a correspondence relationship between the display device and the brightness range that is settable in the display device.

20 Claims, 15 Drawing Sheets

(51) Int. Cl.
*G09G 5/02* (2006.01)
*G09G 5/10* (2006.01)
*H04N 21/485* (2011.01)

(52) U.S. Cl.
CPC ............... *H04N 21/43635* (2013.01); *G09G 2320/0242* (2013.01); *G09G 2320/0626* (2013.01); *G09G 2370/042* (2013.01); *H04N 21/4854* (2013.01)

(58) Field of Classification Search
CPC .... G09G 5/10; G09G 5/006; H04N 21/43635; H04N 21/4854; H04N 21/482; H04N 5/76; H04N 5/66; H04N 5/2355; H04N 19/46; H04N 9/3182; H04N 7/08; G06F 3/14; G11B 27/11
See application file for complete search history.

(56) References Cited

U.S. PATENT DOCUMENTS

| | | | |
|---|---|---|---|
| 2016/0343348 A1* | 11/2016 | Oh | G06F 3/14 |
| 2017/0105042 A1* | 4/2017 | Toma | H04N 7/08 |
| 2017/0221524 A1* | 8/2017 | Uchimura | G11B 27/11 |
| 2017/0229093 A1* | 8/2017 | Sivertsen | G09G 5/006 |
| 2017/0289508 A1* | 10/2017 | Fujioka | H04N 9/3182 |
| 2018/0041801 A1* | 2/2018 | Owaki | H04N 19/46 |
| 2018/0241925 A1* | 8/2018 | Suzuki | H04N 5/66 |
| 2018/0376194 A1* | 12/2018 | Oh | H04N 21/482 |

FOREIGN PATENT DOCUMENTS

| | | |
|---|---|---|
| JP | 2017-143546 A | 8/2017 |
| WO | 2016/063474 A1 | 4/2016 |
| WO | 2017/051808 A1 | 3/2017 |
| WO | 2017/109961 A1 | 6/2017 |

* cited by examiner

| MAKER | MODEL NO. | HDMI TERMINAL | RESOLUTION (MAX.) | FRAME RATE INITIAL | FRAME RATE CORRESPONDENCE (MAX.) | BRIGHTNESS RANGE INITIAL | BRIGHTNESS RANGE HDR COMPATIBILITY | HDMI SETTING METHOD |
|---|---|---|---|---|---|---|---|---|
| COMPANY A | A-103 | HDMI TERMINAL 1 | 2K | 30Hz | 30Hz | SDR | INCOMPATIBLE | Menu>Setup>TV Settings>HDMI mode |
| | | HDMI TERMINAL 2 | 2K | 30Hz | 30Hz | SDR | INCOMPATIBLE | |
| | | HDMI TERMINAL 3 | 2K | 30Hz | 30Hz | SDR | INCOMPATIBLE | |
| COMPANY A | A-105 | HDMI TERMINAL 1 | 4K | 60Hz | 60Hz | HDR | HDR | Menu>Setup>TV Settings>HDMI mode |
| | | HDMI TERMINAL 2 | 4K | 60Hz | 60Hz | SDR | HDR | |
| | | HDMI TERMINAL 3 | 4K | 30Hz | 60Hz | SDR | INCOMPATIBLE | |
| COMPANY B | B-1001 | HDMI TERMINAL 1 | 4K | 60Hz | 60Hz | Dolby | HDR Dolby | Menu>Setup>TV Settings>Video>Performances>HDMI>HDR |
| | | HDMI TERMINAL 2 | 4K | 60Hz | 60Hz | SDR | HDR Dolby | |
| | | HDMI TERMINAL 3 | 4K | 60Hz | 60Hz | SDR | HDR Dolby | |
| COMPANY F | P-01U | HDMI TERMINAL 1 | 4K | 30Hz | 60Hz | SDR | HDR | Menu>Setup>TV Settings>Installation>Performances>HDMI mode |
| | | HDMI TERMINAL 2 | 4K | 60Hz | 60Hz | HDR | HDR | |
| | | HDMI TERMINAL 3 | 4K | 30Hz | 60Hz | SDR | HDR | |

FIG. 2

PLAYBACK DEVICE

CROSS-REFERENCE TO RELATED APPLICATIONS

This application claims priority to Japanese Patent Application No. 2018-019058 filed on Feb. 6, 2018. The entire disclosure of Japanese Patent Application No. 2018-019058 is hereby incorporated herein by reference.

BACKGROUND

Field of the Invention

This invention generally relates to a playback device. More specifically, the present invention relates to a playback device that is configured to be connected to a display device.

Background Information

Playback devices such as a DVD (Digital Versatile Disc) players or BD (Blu-ray (registered trademark)) players are known in the field of playback devices. These playback devices are connected to a display device such as a television set, for example. HDMI (High Definition Multimedia Interface (registered trademark)) is used as a communication interface for transmitting video signals and the like at high speed between the playback device and the display device. Therefore, the display device and the playback device each have an HDMI terminal for HDMI connection.

In recent years, playback devices capable of playing back video content compatible with HDR (High Dynamic Range) and whose brightness range is wider than that of SDR (Standard Dynamic Range) have been proposed (see, Japanese Patent Application Publication No. 2017-143546 (Patent Literature 1), for example). In order to play back HDR compatible video content, the user needs to connect the playback device to the HDR compatible HDMI terminal of the display device, and set the brightness range to HDR on the display device side.

SUMMARY

However, a user who is unfamiliar with the operation of the playback device or the like can end up playing back HDR compatible video content in a state in which the playback device is connected to an HDMI terminal of the display device that is not compatible with HDR, or in a state in which the brightness range is set to SDR on the display device side. If this should happen, the problem will be that the HDR compatible video content is not properly outputted from the playback device to the display device.

One object is to provide a playback device with which information related to a setting change to a specific brightness range can be provided to a user.

In view of the state of the known technology and in accordance with an aspect of the present invention, a playback device is configured to be connected to a display device. The playback device comprises a communication component and a controller. The communication component communicates with the display device. The controller acquires setting information indicating a current setting of a brightness range in the display device from the display device via the communication component. While a specific brightness range has not been set in the display device, the controller transmits information related to a setting change to the specific brightness range via the communication component to the display device based on correspondence information indicating a correspondence relationship between the display device and the brightness range that is settable in the display device.

BRIEF DESCRIPTION OF THE DRAWINGS

Referring now to the attached drawings which form a part of this original disclosure:

FIG. 2 is a diagram showing an example of correspondence information according to the first embodiment;

DETAILED DESCRIPTION OF EMBODIMENTS

Selected embodiments will now be explained with reference to the drawings. It will be apparent to those skilled in the field of playback devices from this disclosure that the following descriptions of the embodiments are provided for illustration only and not for the purpose of limiting the invention as defined by the appended claims and their equivalents. All of the embodiments described below represent comprehensive or concrete examples. The numerical values, shapes, materials, constituent elements, arrangement positions of constituent elements, connection mode, and so forth given in the following embodiments are mere examples, and are not intended to limit the present invention. Also, of the constituent elements in the following embodiments, those that are not described in an independent claim shall be described as optional constituent elements.

First Embodiment 1-1. Configuration of Playback System

Figure 1:
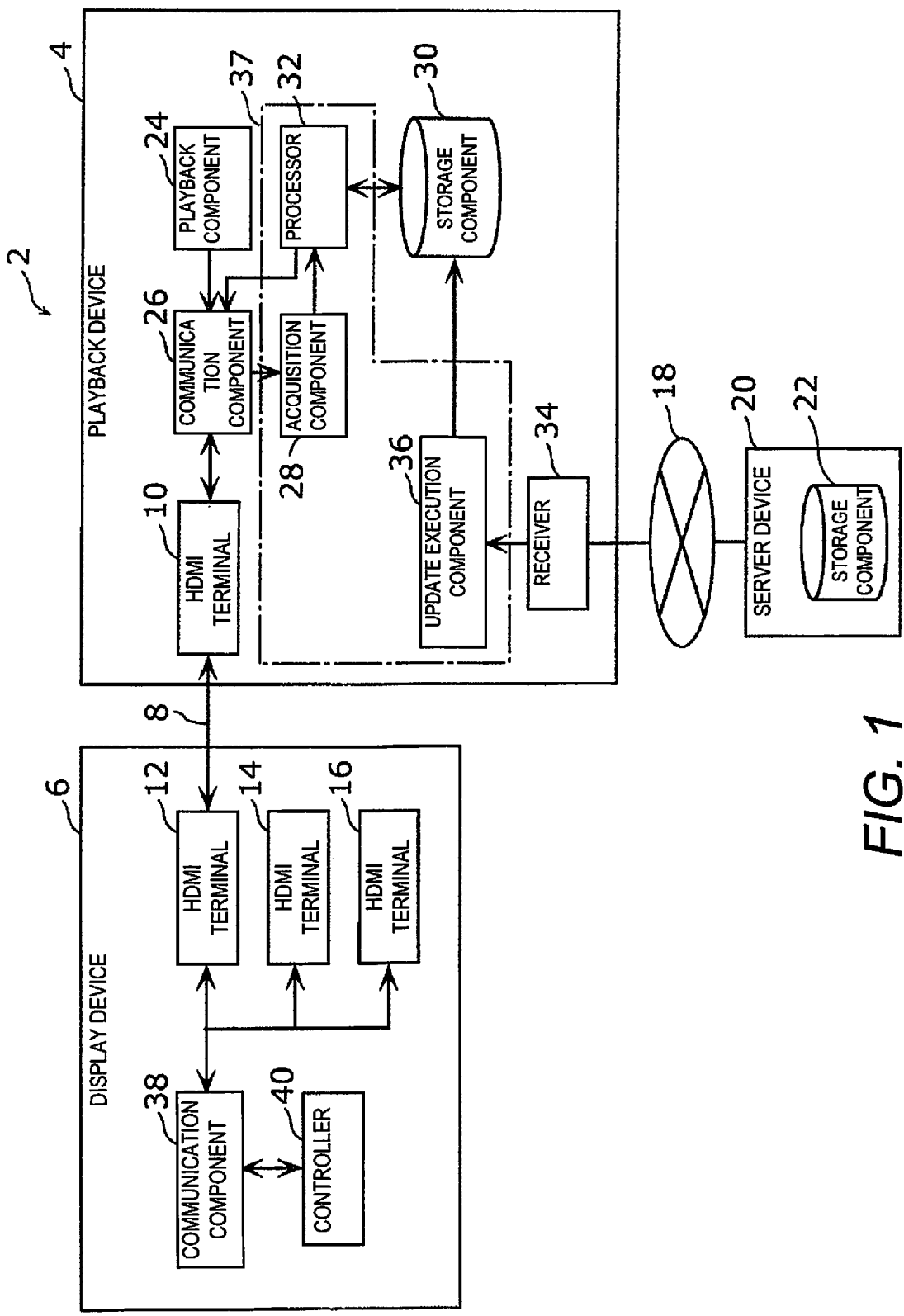
FIG. 1 is a block diagram of the configuration of a playback system according to a first embodiment.

First, the configuration of a playback system 2 according to a first embodiment will be described through reference to FIG. 1. FIG. 1 is a block diagram of the configuration of the playback system 2 according to the first embodiment.

As shown in FIG. 1, the playback system 2 comprises a playback device 4 and a display device 6. The playback device 4 is, for example, a digital video player for playing back video content stored on a DVD, a BD, or the like. The display device 6 is, for example, a television set for displaying the video content played back by the playback device 4.

Both the playback device 4 and the display device 6 are HDMI devices. The playback device 4 and the display device 6 are connected together via an HDMI cable 8. The HDMI cable 8 is a cable conforming to the HDMI standard, and is a cable for transmitting digital signals. The HDMI standard is a standard of a communication interface for transmitting video signals and audio signals as digital signals.

The playback device 4 comprises an HDMI terminal 10 for connecting the HDMI cable 8. The display device 6 comprises a plurality of HDMI terminals 12, 14, and 16 (an example of a plurality of connection terminals) for connecting the HDMI cable 8. In the following description, the HDMI terminals 12, 14, and 16 can be referred to as "HDMI terminal 1," "HDMI terminal 2," and "HDMI terminal 3," respectively.

The playback device 4 is connected to a server device 20 (an example of an external device) via a network 18. The server device 20 comprises a storage component 22 that stores update information related to the updating of correspondence information (discussed below). The network 18 is the Internet, for example.

1-2. Configuration of Playback Device

The configuration of the playback device 4 according to the first embodiment will now be described through reference to FIGS. 1 and 2. FIG. 2 is a diagram showing an example of the correspondence information according to the first embodiment.

As shown in FIG. 1, the playback device 4 comprises a playback component 24, a communication component 26, an acquisition component 28, a storage component 30, a processor 32, a receiver 34, and an update execution component 36. The acquisition component 28, the processor 32, and the update execution component 36 constitute an electric controller 37. The controller 37 is realized, for example, by having a processor or microcomputer read and execute a software program recorded to a recording medium such as a hard disk or a semiconductor memory. In other words, the controller 37 is formed by a processor or microcomputer.

The playback component 24 plays back video content stored on a DVD or a BD, for example. More specifically, the playback component 24 includes a disk drive, such as a DVD drive or a BD drive. The video content is HDR compatible video content, for example.

The communication component 26 communicates with the display device 6. The communication component 26 exchanges various kinds of data with the display device 6 via the HDMI terminal 10 and the HDMI cable 8. More specifically, the communication component 26 receives EDID (Extended Display Identification Data) information and the like transmitted from the display device 6, for example. The communication component 26 also transmits the video content played back by the playback component 24 and the image signal generated by the processor 32 to the display device 6. For example, the communication component 26 includes an HDMI transmitter and an HDMI receiver.

The EDID information is data including, for example, a) the corresponding resolution of the display device 6, b) the name of the manufacturer of the display device 6, c) the model number of the display device 6, and d) the current setting of the brightness range on the display device 6. That is, the EDID information is an example of the setting information indicating the current setting of the brightness range on the display device 6. Either HDR (an example of a specific brightness range) or SDR can be set as the brightness range for each of the HDMI terminals 12, 14, and 16 in the display device 6.

The acquisition component 28 acquires the EDID information transmitted from the display device 6, via the communication component 26. The acquisition component 28 outputs the acquired EDID information to the processor 32. Thus, the acquisition component 28 (or the controller 37) acquires the setting information indicating the current setting of the brightness range in the display device 6 from the display device 6 via the communication component 26.

The storage component 30 is a computer memory for storing the correspondence information in advance. The correspondence information is a data table showing the correspondence relationships between a plurality of types of display devices and the brightness ranges that are settable in the display devices.

The correspondence information is, for example, the data table, as shown in FIG. 2. In the example shown in FIG. 2, the correspondence information includes information related to various models of display devices manufactured by different companies and currently offered for sale in the market, including the display device 6 connected to the playback device 4. For example, the second line of the correspondence information holds information related to a display device of model number "A-105" made by "Company A." More specifically, the second line of the correspondence information holds a) the name of the manufacturer of the display device ("Company A"), b) the model number "A-105" of the display device, c) the type of HDMI terminal of the display device ("HDMI terminals 1 to 3"), d) the corresponding resolution "4K" of each HDMI terminal, e) the corresponding frame rate (maximum frame rate) of "60 Hz" for each HDMI terminal, f) the corresponding brightness range of "HDR/incompatible" for each HDMI terminal, and g) setting method information ("Menu>Setup>TV Settings>HDMI mode") indicating how to set the brightness range.

Here, regarding the corresponding brightness range, the correspondence information shown in FIG. 2 indicates that the "HDMI terminal 1" and the "HDMI terminal 2" each correspond to HDR (HDR compatible), but the "HDMI terminal 3" does not correspond to HDR (HDR incompatible). Since "HDR" is the initial value of the setting of the brightness range at the "HDMI terminal 1," in playing back HDR compatible video content, the HDMI cable 8 can simply be connected to the "HDMI terminal 1," with no need to change the setting of the brightness range in the display device 6. On the other hand, with the "HDMI terminal 2," since the initial value of the setting of the brightness range is "SDR," in playing back HDR compatible video content, it is necessary to connect the HDMI cable 8 to "HDMI terminal 2" and to change the setting of the brightness range from SDR to HDR in the display device 6.

The setting method information is information indicating the method for setting the brightness range on the display device 6. More specifically, the setting method information indicates the hierarchical structure of the menu screens displayed on the display device 6. In other words, the menu screens are formed as a hierarchical menu in which items are ranked according to levels of specificity. The setting method information indicates a path to a submenu screen for setting the brightness range from a main menu screen. For instance, "Menu" shows a main menu screen, "Setup" shows a submenu screen for executing setup of a display device, "TV Settings" shows a submenu screen for executing various settings of the display device, and "HDMI mode" shows a submenu screen for setting the brightness range. In setting the brightness range, for example, the user operates a remote control or the like of the display device 6 so that the submenu screen of "HDMI mode" is displayed from the main menu screen of "Menu" through the submenu screens of "Setup" and "TV Settings."

The processor 32 determines whether or not the brightness range in the display device 6 is set to HDR based on the EDID information from the acquisition component 28. If the processor 32 determines that the brightness range of the display device 6 is not set to HDR, the processor 32 generates an image signal (an example of a message signal) for displaying a confirmation screen on the display device 6 based on the correspondence information stored in the storage component 30. The processor 32 outputs the generated image signal to the communication component 26.

The confirmation screen is used to provide the user with information related to a setting change to HDR (an example of information related to a setting change to a specific brightness range). That is, the image signal includes the information related to the setting change to HDR. The information related to the setting change to HDR is, for example, information prompting the user to change the connection of the HDMI cable 8 to the HDMI compatible HDMI terminal, or to change the setting of the brightness range from SDR to HDR on the display device 6. Thus, in the illustrated embodiment, the controller 37 transmits the information related to the setting change to HDR (an example of a specific brightness range) via the communication component 26 to the display device 6 based on the correspondence information indicating the correspondence relationship between the display device 6 and the brightness range that is settable in the display device 6. A specific example of the confirmation screen will be discussed below.

The receiver 34 receives the update information transmitted from the server device 20, via the network 18. The receiver 34 outputs the received update information to the update execution component 36. The server device 20 periodically (for example, every few days) transmits the update information to the playback device 4. The update information includes, for example, information related to newly released models of display devices. In particular, the update information includes the same types of information as shown in FIG. 2 only for the newly released models of display devices. For example, the update information includes correspondence relationships between the newly released models of display devices (an example of an additional display device) and the brightness ranges that are settable in the newly released models of display devices.

The update execution component 36 updates the correspondence information stored in the storage component 30 based on the update information from the receiver 34. Consequently, the information related to the newly released models of the display devices, for example, is added to the correspondence information stored in the storage component 30.

1-3. Configuration of Display Device

The configuration of the display device 6 according to the first embodiment will now be described through reference to FIG. 1. As shown in FIG. 1, the display device 6 comprises a communication component 38 and a controller 40.

The communication component 38 exchanges various kinds of data with the playback device 4 via the HDMI terminal 12 (14, 16) and the HDMI cable 8. More specifically, the communication component 38 receives the video content, image signal, etc., transmitted from the playback device 4, for example. The communication component 38 also transmits the EDID information and the like to the playback device 4. For example, the communication component 38 includes an HDMI transmitter and an HDMI receiver.

The controller 40 controls what is displayed on the display device 6. More specifically, the controller 40 causes the display device 6 to display video content, a confirmation screen, etc., for example. The controller 40 is formed by a processor or microcomputer, for example.

1-4. Operation of Playback System

Figure 3:
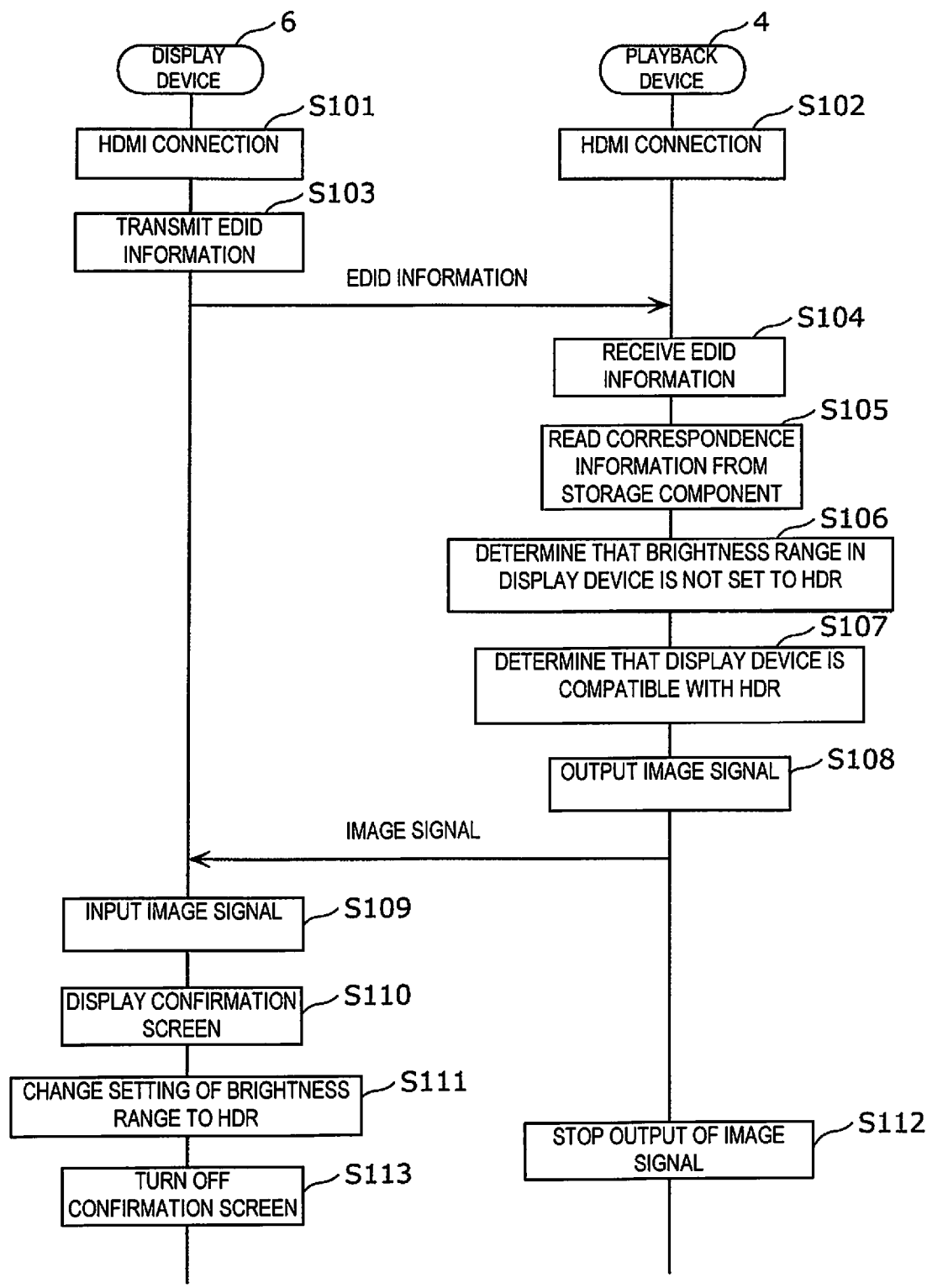
FIG. 3 is a sequence diagram showing the operation of the playback system according to the first embodiment.
Figure 4:
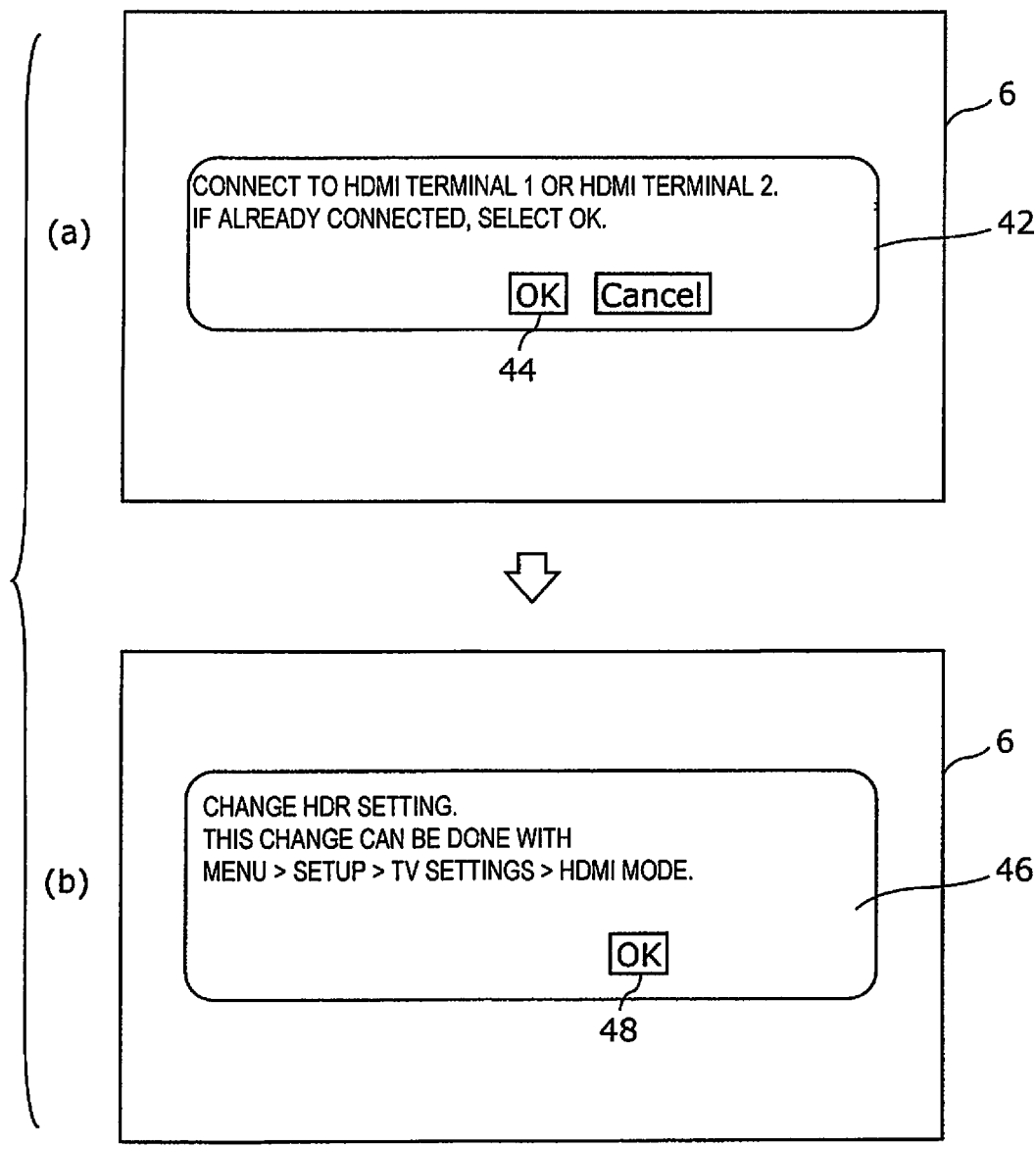
FIG. 4 is a diagram showing a display example of a confirmation screen according to the first embodiment.
Figure 5:
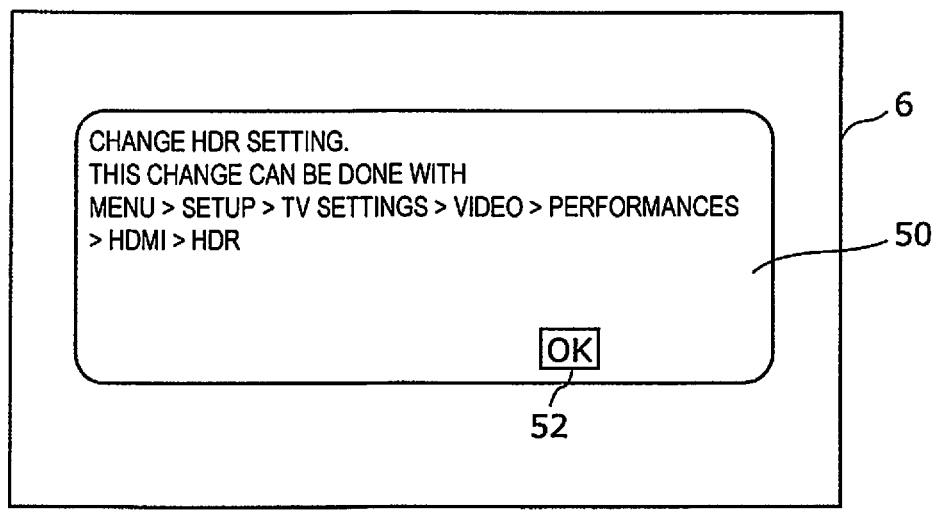
FIG. 5 is a diagram showing a display example of a confirmation screen according to the first embodiment.

The operation of the playback system 2 according to the first embodiment will now be described through reference to FIGS. 3 to 5. FIG. 3 is a sequence diagram showing the operation of the playback system 2 according to the first embodiment. FIG. 4 is a diagram showing display examples of confirmation screens 42 and 46 according to the first embodiment. FIG. 5 is a diagram showing a display example of a confirmation screen 50 according to the first embodiment.

As shown in FIG. 3, first the user connects the HDMI cable 8 to one of the HDMI terminals 12, 14, and 16 of the display device 6 (S101), and connects the HDMI cable 8 to the HDMI terminal 10 of the playback device 4 (S102).

In the following description, it will be assumed that the display device 6 is compatible with an HDR brightness range, and that the brightness range is initially set to SDR for one of the HDMI terminals 12, 14, and 16 to which the HDMI cable 8 is connected.

The communication component 38 of the display device 6 transmits the EDID information to the playback device 4 (S103). This EDID information includes the setting information and the like indicating that the brightness range is set to SDR in the display device 6. The communication component 26 of the playback device 4 receives the EDID information from the display device 6 (S104). The acquisition component 28 of the playback device 4 acquires the EDID information via the communication component 26, and outputs the acquired EDID information to the processor 32.

The processor 32 of the playback device 4 reads the necessary information from the correspondence information stored in the storage component 30 based on the EDID information from the acquiring component 28 (S105). For example, if the EDID information includes the manufacturer name "Company A" and the model number "A-105," then the processor 32 reads the information corresponding to the manufacturer name "Company A" and the model number "A-105" from the correspondence information (the information on the second line of the correspondence information shown in FIG. 2).

The processor 32 determines that the brightness range in the display device 6 is not set to HDR based on the EDID information (S106). Although not depicted in the drawings, the processing ends if the brightness range has already been set to HDR in the display device 6.

In addition, the processor 32 determines that the display device 6 is compatible with HDR for the brightness range based on the correspondence information (S107). For example, if the display device 6 is a device of the model number "A-105" made by the "Company A" (see FIG. 2), then the processor 32 determines that the display device 6 is compatible with HDR for the brightness range since the "HDMI terminal 1" and the "HDMI terminal 2" are HDR compatible, as shown in FIG. 2.

Although not depicted, if the display device 6 is a device of the model number "A-103" made by the "Company A" (see FIG. 2), for example, then the processor 32 determines that the display device 6 is not compatible with HDR for the brightness range since the "HDMI terminal 1," the "HDMI terminal 2," and the "HDMI Terminal 3" are all HDR incompatible, as shown in FIG. 2. In this case, the processing ends.

The processor 32 generates an image signal for displaying a confirmation screen on the display device 6, and outputs the generated image signal to the communication component 26, based on the correspondence information. The communication component 26 of the playback device 4 transmits (outputs) the image signal to the display device 6 (S108). That is, the processor 32 transmits the generated image signal to the display device 6 via the communication component 26.

The communication component 38 of the display device 6 receives (inputs) the image signal from the playback device 4 (S109). The controller 40 of the display device 6 displays a confirmation screen on the display device 6 based on the inputted image signal (S110).

A display example of the confirmation screen in step S110 will now be described. First, a display example of the confirmation screen 42 when the display device 6 is a device of the model number "A-105" made by the "Company A" (see FIG. 2) will be described through reference to FIG. 4. As shown in part (a) in FIG. 4, the confirmation screen 42 is displayed on the display device 6. For example, on the confirmation screen 42 is displayed a message prompting the user to change the connection of the HDMI cable 8: "Connect to HDMI terminal 1 or HDMI terminal 2. If already connected, select OK."

At this point, if the HDMI cable 8 is connected to the HDR compatible "HDMI terminal 1" (HDMI terminal 12) or "HDMI terminal 2" (HDMI terminal 14), then the user selects the OK button 44 by using the remote control or the like of the display device 6, without changing the connection of the HDMI cable 8. On the other hand, if the HDMI cable 8 is connected to the HDR incompatible "HDMI terminal 3" (HDMI terminal 16), then the user selects the OK button 44 by using the remote control or the like of the display device 6 after first changing the connection of the HDMI cable 8 to the "HDMI terminal 1" or the "HDMI terminal 2."

When the user selects the OK button 44 on the confirmation screen 42, the confirmation screen 46 shown in part (b) in FIG. 4 is displayed on the display device 6. A message prompting the user to change the setting of the brightness range is displayed on the confirmation screen 46, such as "Change HDR setting. This change can be done with Menu>Setup>TV Settings>HDMI mode." The "Menu>Setup>TV Settings>HDMI mode" displayed on the confirmation screen 46 is displayed based on the setting method information included in the correspondence information. The user operates the remote control or the like of the display device 6 to change the brightness range from SDR to HDR, and then selects the OK button 48.

A display example of a confirmation screen 50 when the display device 6 is a device of the model number "B-1001" made by the "Company B" (see FIG. 2) will now be described through reference to FIG. 5. As shown in FIG. 5, a message prompting the user to change the setting of the brightness range is displayed on the confirmation screen 50, such as "Change HDR setting. This change can be done with Menu>Setup>TV Settings>Video>Performances>HDMI>HDR." The "Menu>Setup>TV Settings>Video>Performances>HDMI>HDR" displayed on the confirmation screen 50 is displayed based on the setting method information included in the correspondence information. In this case, as shown in FIG. 2, since the "HDMI terminal 1," the "HDMI terminal 2," and the "HDMI terminal 3" are all compatible with HDR (third line in the correspondence information in FIG. 2), a message prompting the user to change the connection of the HDMI cable 8 is not displayed on the confirmation screen 50. The user operates the remote controller or the like of the display device 6 to change the brightness range from SDR to HDR (Dolby), and then selects an OK button 52.

Returning to FIG. 3, changing the setting of the brightness range from SDR to HDR in the display device 6 as described above (S111) causes the communication component 26 of the playback device 4 to stop transmission (output) of the image signal (S112). Consequently, the controller 40 of the display device 6 turns off the display of the confirmation screen (S113).

1-5. Effect

Next, the effect obtained with the playback device 4 according to the first embodiment will be described. For example, when the user plays back HDR compatible video content with the playback device 4, the confirmation screen 42 (46, 50) is displayed on the display device 6. This makes it possible to prompt the user to change the connection of the HDMI cable 8, or to change the setting of the brightness range on the display device 6, for example. As a result, HDR compatible video content can be correctly outputted from the playback device 4 to the display device 6.

Second Embodiment 2-1. Configuration of Playback System

Figure 6:
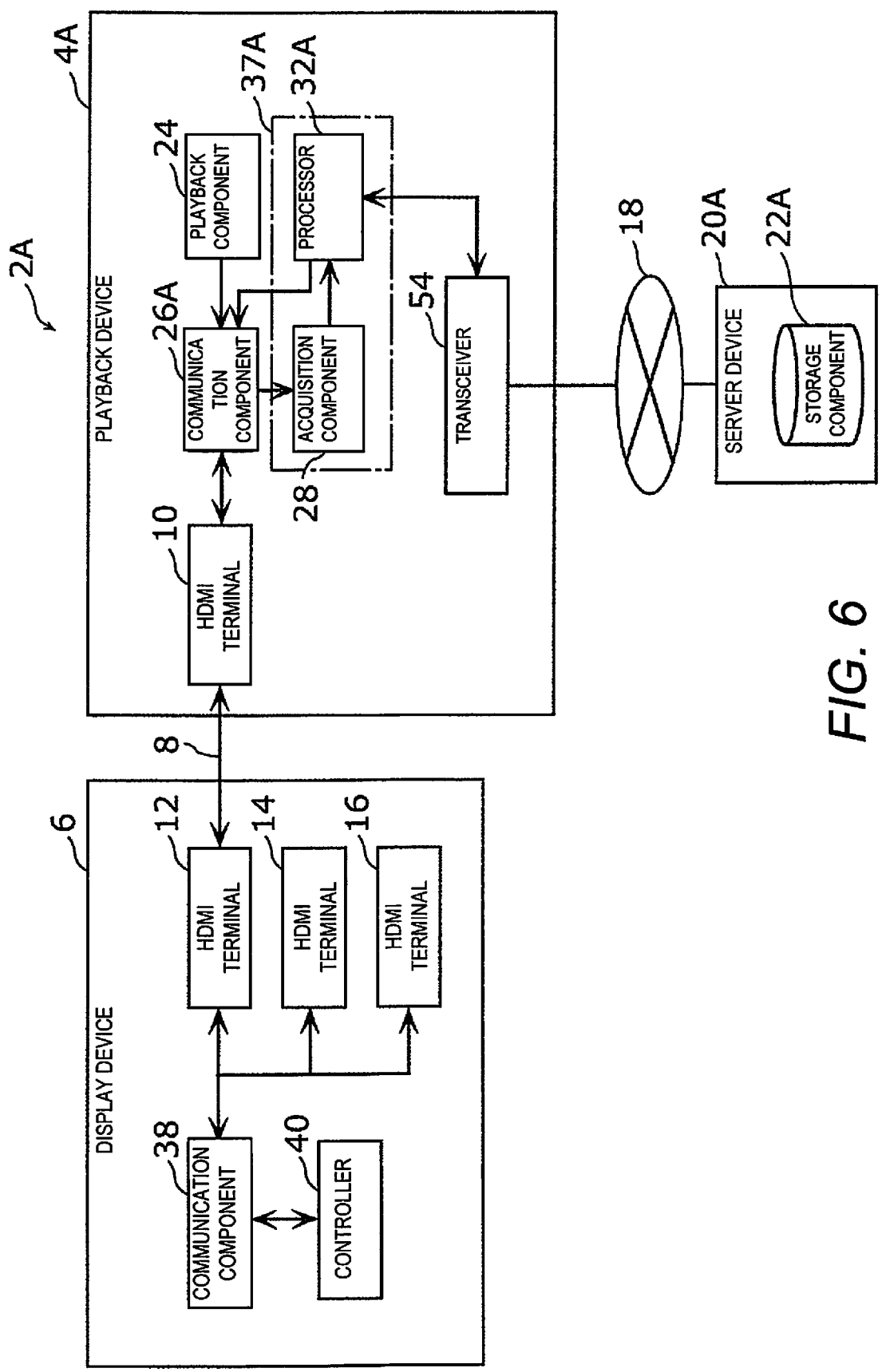
FIG. 6 is a block diagram of the configuration of a playback system according to a second embodiment.

The configuration of the playback system 2A according to a second embodiment will be described through reference to FIG. 6. FIG. 6 is a block diagram of the configuration of the playback system 2A according to the second embodiment. In FIG. 6, those components that are the same as the components in FIG. 1 of the first embodiment are numbered the same and will not be described again. This also applies to the other embodiments given below.

As shown in FIG. 6, with the playback system 2A according to the second embodiment, a storage component 22A of a server device 20A stores correspondence information. That is, unlike in the first embodiment, the correspondence information is not stored in advance in the playback device 4A.

A processor 32A of a playback device 4A generates a request signal for requesting the server device 20A to transmit the correspondence information. An acquisition component 28 and the processor 32A constitute an electric controller 37A. In the illustrated embodiment, the controller 37A is formed by a processor or microcomputer.

The playback device 4A comprises a transceiver 54 instead of the receiver 34 of the first embodiment. The transceiver 54 transmits the request signal generated by the processor 32A to the server device 20A via the network 18. The transceiver 54 also receives the correspondence information transmitted from the server device 20A based on the request signal via the network 18.

2-2. Operation of Playback System

Figure 7:
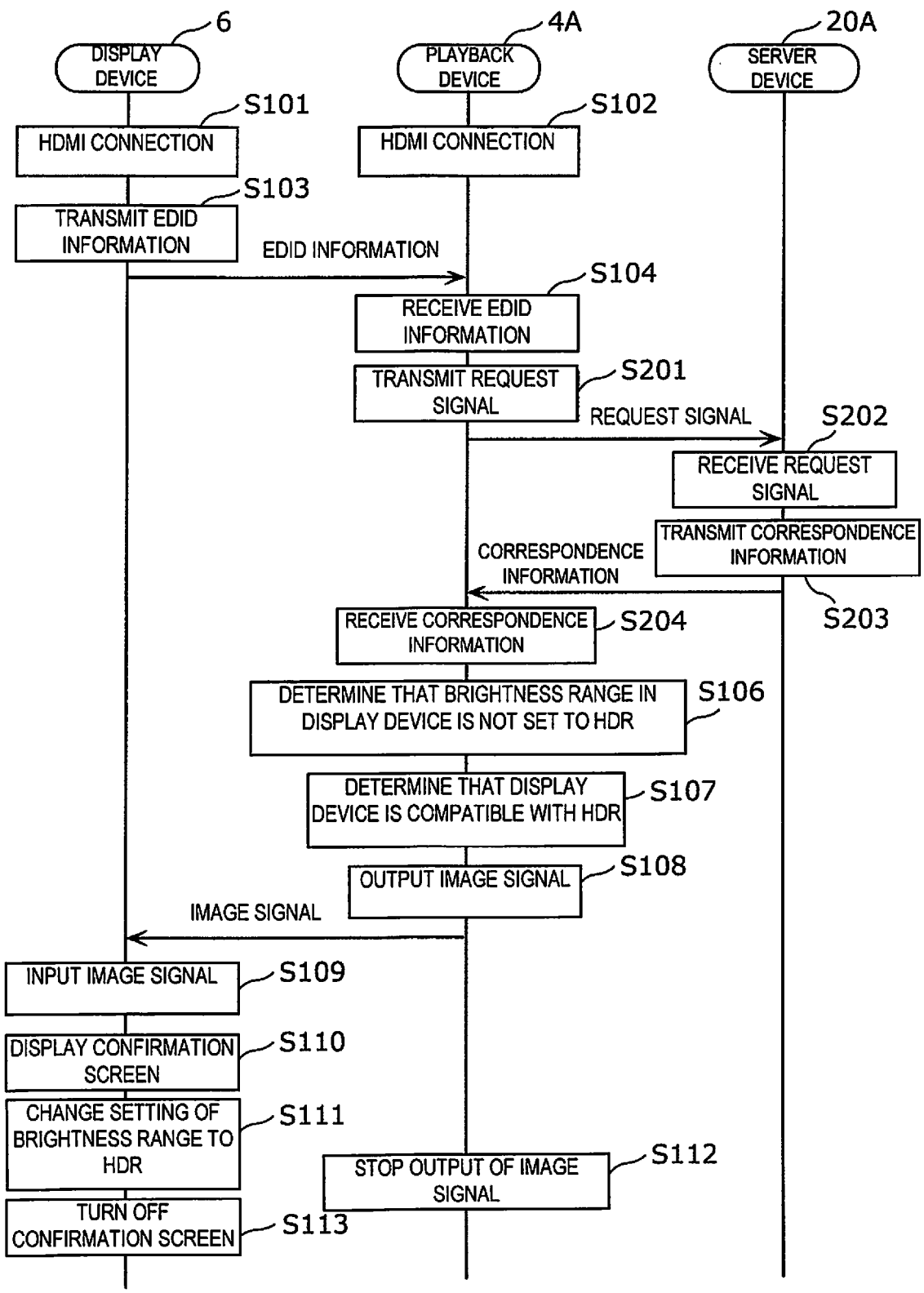
FIG. 7 is a sequence diagram showing the operation of the playback system according to the second embodiment.

The operation of the playback system 2A according to the second embodiment will now be described through reference to FIG. 7. FIG. 7 is a sequence diagram showing the operation of the playback system 2A according to the second embodiment. In FIG. 7, those steps that are the same as in FIG. 3 of the first embodiment are numbered the same and will not be described again. This also applies to the other embodiments given below.

As shown in FIG. 7, steps S101 to S104 are executed as in the first embodiment. After this, the transceiver 54 of the playback device 4A transmits a request signal to the server device 20A (S201). The server device 20A receives the request signal from the playback device 4A (S202), and transmits the correspondence information stored in the storage portion 22A to the playback device 4A (S203) based on the received request signal.

The transceiver 54 of the playback device 4A receives the correspondence information from the server device 20A (S204), and outputs the received correspondence information to the processor 32A. After this, steps S106 to S113 are executed just as in the first embodiment.

2-3. Effect

As described above, since the correspondence information is held in the server device 20A, there is no need to store the correspondence information in the playback device 4A in advance. Thus, less storage space in the playback device 4A is taken up. Also, the update processing of the correspondence information in the server device 20A can be more easily executed.

Third Embodiment 3-1. Configuration of Playback System

Figure 8:
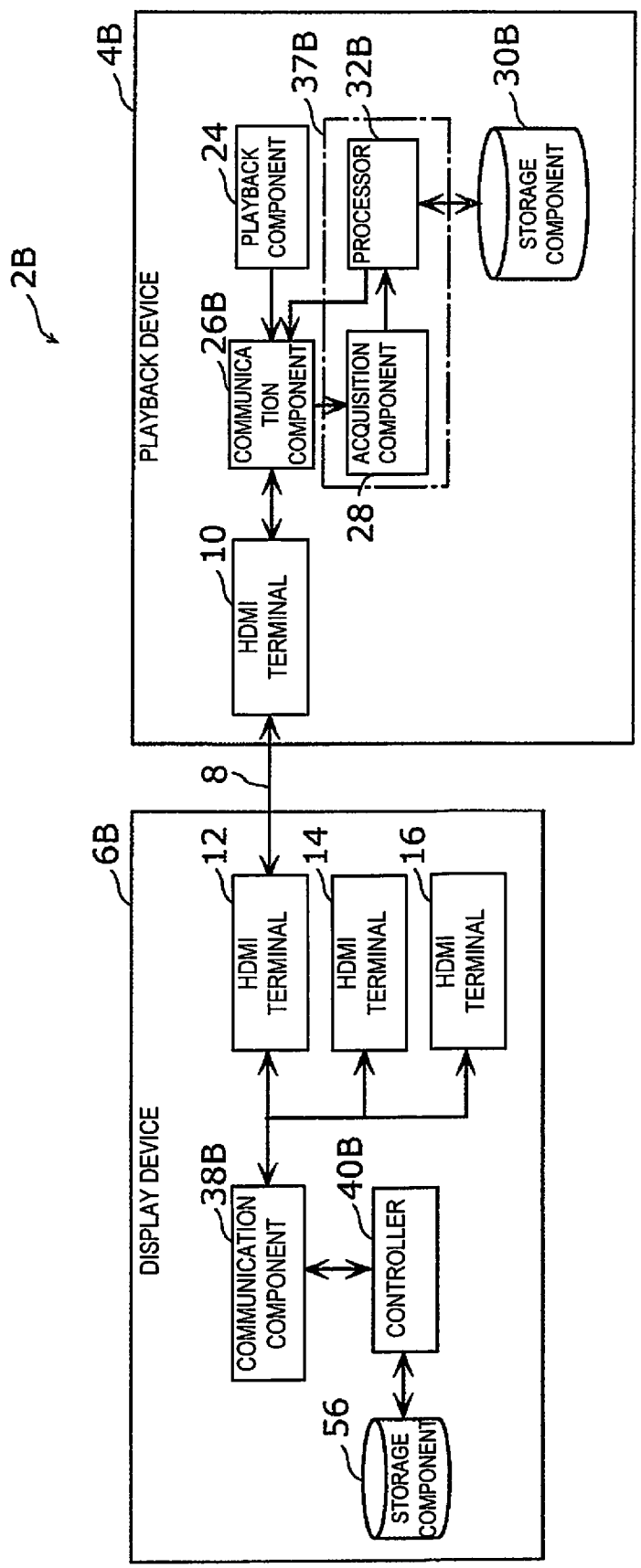
FIG. 8 is a block diagram of the configuration of a playback system according to a third embodiment.

The configuration of the playback system 2B according to a third embodiment will now be described through reference to FIG. 8. FIG. 8 is a block diagram of the configuration of the playback system 2B according to the third embodiment.

As shown in FIG. 8, with the playback system 2B according to the third embodiment, a communication component 26B of a playback device 4B is a CEC (Consumer Electronics Control) communication interface that exchanges CEC commands with a display device 6B. A communication component 38B of the display device 6B is also a CEC communication interface that exchanges the CEC commands with the playback device 4B.

In the HDMI standard, the CEC is defined for linking between a plurality of HDMI devices. According to the CEC, the CEC commands are bidirectionally communicated between a plurality of HDMI devices. This communication is called CEC communication.

A processor 32B of the playback device 4B generates a request signal, which is a CEC command for requesting the display device 6B to transmit correspondence information. The processor 32B generates a request signal using a vendor specific command of the CEC, for example. A storage component 30B of the playback device 4B stores the correspondence information transmitted from the display device 6B. The acquisition component 28 and the processor 32B constitute an electric controller 37B. In the illustrated embodiment, the controller 37B is formed by a processor or microcomputer.

The display device 6B comprises a storage component 56 that stores the correspondence information. That is, unlike in the first embodiment, no correspondence information is stored in advance in the playback device 4B. The correspondence information stored in the storage component 56 includes only information related to the display device 6B connected to the playback device 4B. In other words, the correspondence information stored in the storage component 56 includes the same types of information as shown in FIG. 2 only for the display device 6B.

An electric controller 40B of the display device 6B generates a response signal, which is a CEC command for notifying the playback device 4B of the correspondence information stored in the storage component 56, based on the request signal from the playback device 4B. The controller 40B generates the response signal using the CEC vendor specific command, for example. The response signal includes information indicating to which terminal the HDMI cable 8 is currently connected (that is, one of the HDMI terminals 12, 14, and 16 of the display device 6B). In the illustrated embodiment, the controller 40B is formed by a processor or microcomputer.

3-2. Operation of Playback System

Figure 9:
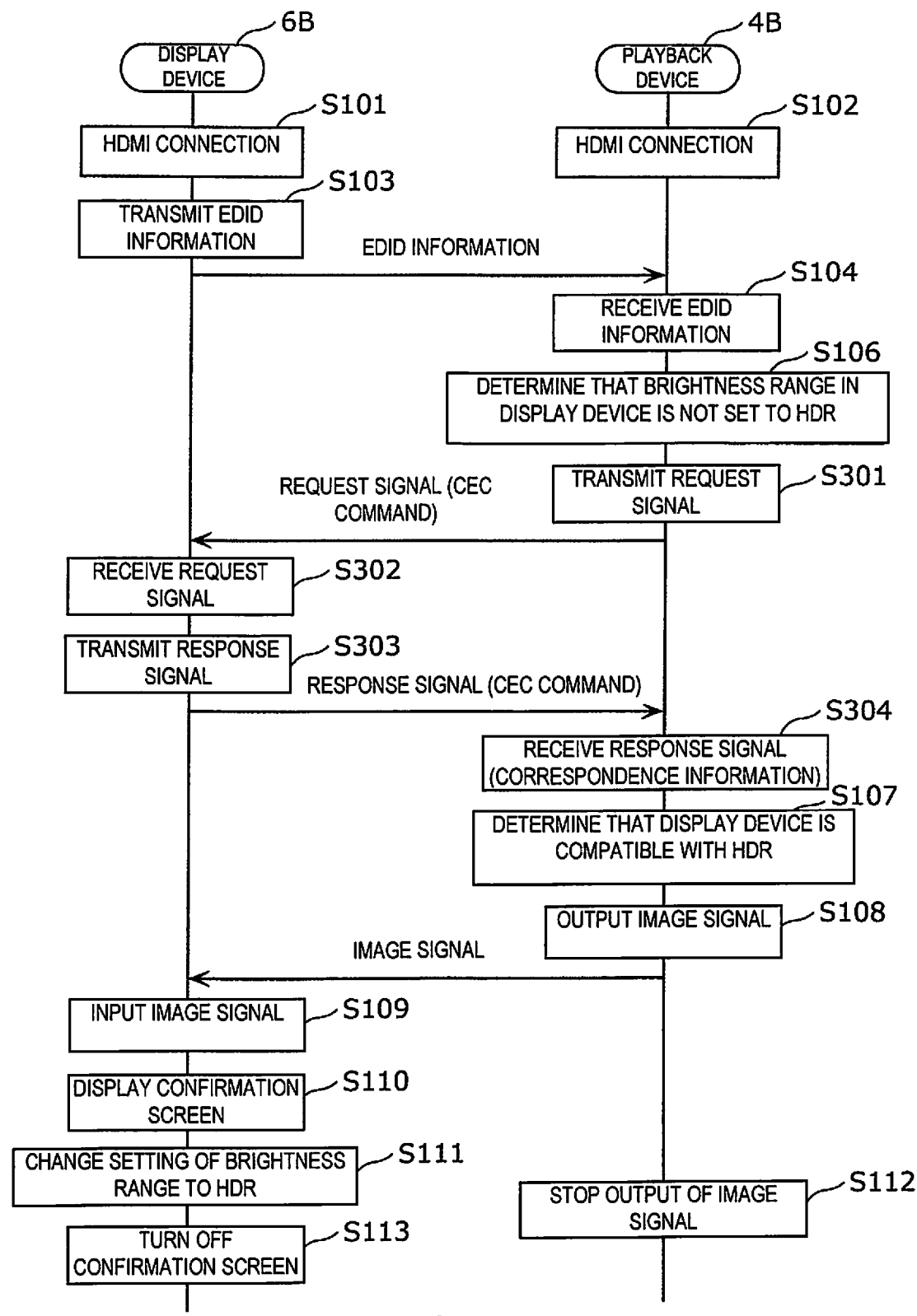
FIG. 9 is a sequence diagram showing the operation of the playback system according to the third embodiment.
Figure 10:
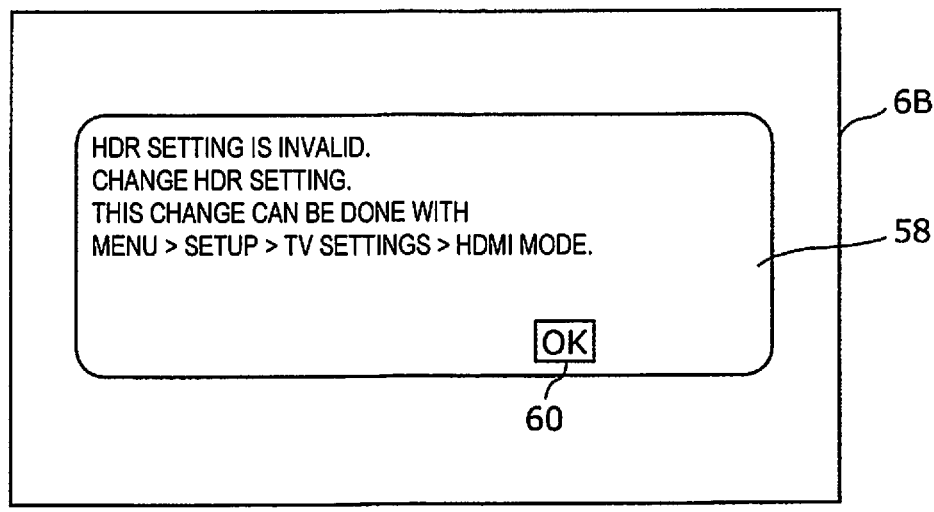
FIG. 10 is a diagram showing a display example of a confirmation screen according to the third embodiment.
Figure 11:
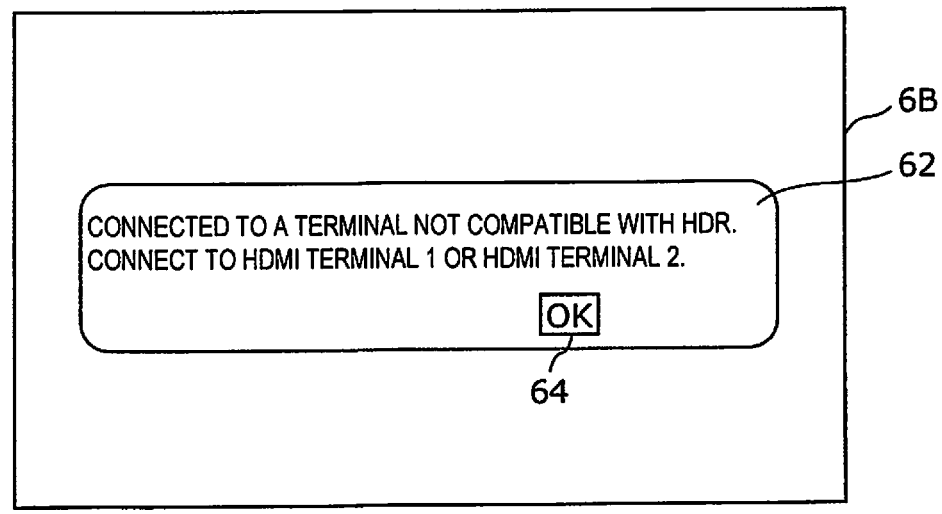
FIG. 11 is a diagram showing a display example of a confirmation screen according to the third embodiment.

The operation of the playback system 2B according to the third embodiment will now be described through reference to FIGS. 9 to 11. FIG. 9 is a sequence diagram showing the operation of the playback system 2B according to the third embodiment. FIG. 10 is a diagram showing a display example of the confirmation screen 58 according to the third embodiment. FIG. 11 is a diagram showing a display example of a confirmation screen 62 according to the third embodiment.

As shown in FIG. 9, first, steps S101 to S104 and S106 are executed as in the first embodiment. After this, the processor 32B of the playback device 4B generates the request signal, which is the CEC command, and the communication component 26B of the playback device 4B transmits the request signal generated by the processor 32B to the display device 6B (S301).

The communication component 38B of the display device 6B receives the request signal from the playback device 4B (S302), and outputs the received request signal to the controller 40B. The controller 40B of the display device 6B reads the correspondence information from the storage component 56 based on the request signal, and generates the response signal, which is the CEC command. The communication component 38B of the display device 6B transmits the response signal generated by the controller 40B to the playback device 4B (S303).

The communication component 26B of the playback device 4B receives the response signal from the display device 6B (S304) and outputs the received response signal to the processor 32B. That is, the processor 32B receives the response signal transmitted from the display device 6B, via the communication component 26B. At this point, the processor 32B can store the correspondence information included in the response signal in the storage component 30B. This allows step S105 of the first embodiment be executed instead of steps S301 to S304 the next time. By recognizing to which terminal the HDMI cable 8 is currently connected based on the response signal, the processor 32B can generate an image signal of the confirmation screen according to the current connection of the HDMI cable 8. After this, steps S107 to S113 are executed as in the first embodiment.

Here, a display example of the confirmation screen in step S110 will be described in association with the fact that the response signal includes the information indicating the current connection of the HDMI cable 8. First, through reference to FIG. 10, a display example of the confirmation screen 58 will be described that is displayed when the display device 6B is a device of the model number "A-105" manufactured by the "Company A" (see FIG. 2) and the HDMI cable 8 is connected to the HDR compatible "HDMI terminal 1" (HDMI terminal 12) or "HDMI terminal 2"

(HDMI terminal 14). As shown in FIG. 10, the confirmation screen 58 displays a message prompting the user to change the setting of the brightness range, such as "HDR setting is invalid. Change HDR setting. This change can be done with Menu>Setup>TV Settings>HDMI mode." The user operates the remote control of the display device 6B or the like to change the setting of the brightness range from SDR to HDR, and then selects the OK button 60.

Next, through reference to FIG. 11, a display example of the confirmation screen 62 will be described that is displayed when the display device 6B is a device of the model number "A-105" made by the "Company A" (see FIG. 2) and the HDMI cable 8 is connected to the HDR incompatible "HDMI terminal 3" (HDMI terminal 16). As shown in FIG. 11, the confirmation screen 62 displays a message prompting the user to change the connection of the HDMI cable 8, such as "Connected to a terminal not compatible with HDR. Connect to HDMI terminal 1 or HDMI terminal 2." The user changes the connection of the HDMI cable 8 to the "HDMI terminal 1" or the "HDMI terminal 2," and then operates the remote control of the display device 6B or the like to select the OK button 64.

3-3. Effect

As described above, since the correspondence information is held in the display device 6B, there is no need to store the correspondence information in the playback device 4B in advance. Thus, less of the storage space in the playback device 4B is taken up.

Fourth Embodiment 4-1. Configuration of Playback System

Figure 12:
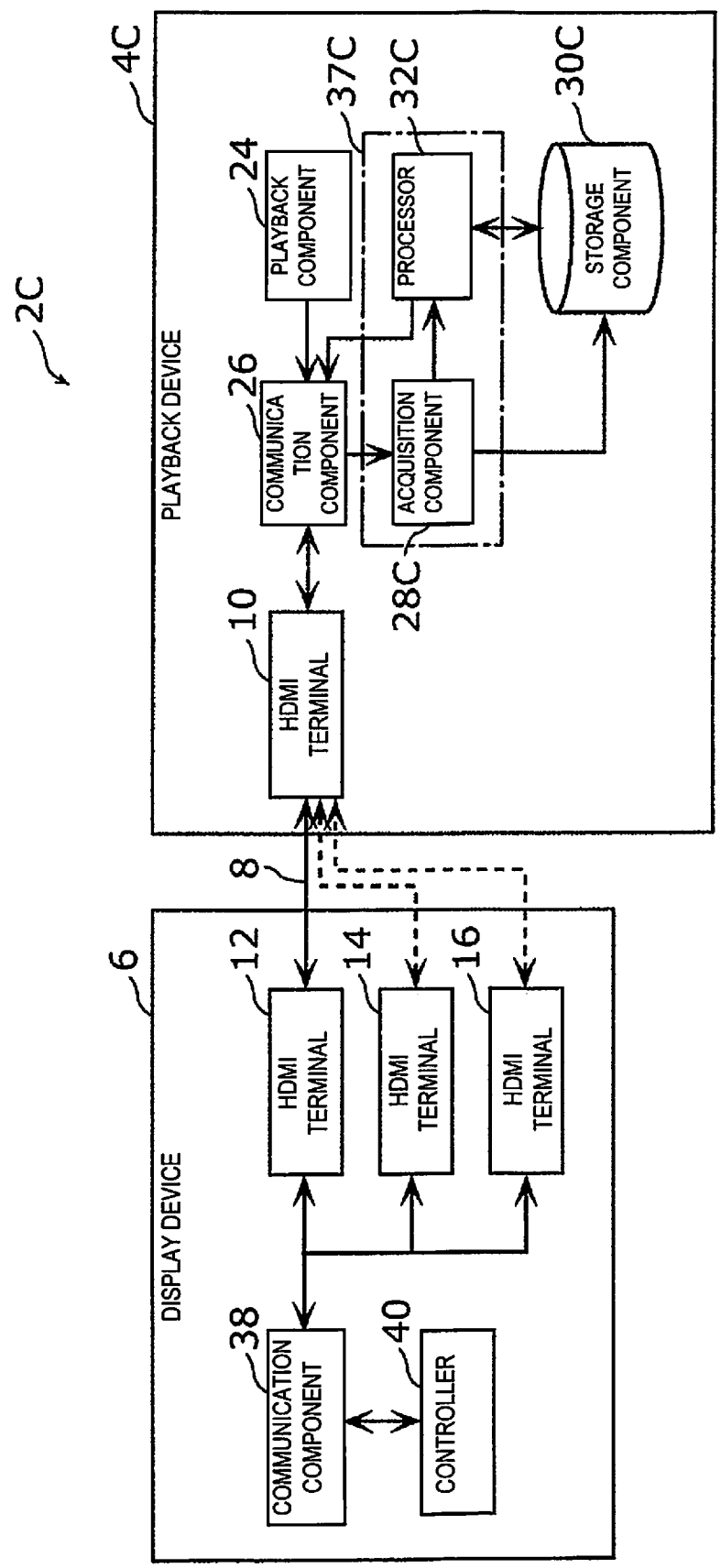
FIG. 12 is a block diagram of the configuration of a playback system according to a fourth embodiment.

The configuration of the playback system 2C according to a fourth embodiment will now be described through reference to FIG. 12. FIG. 12 is a block diagram of the configuration of the playback system 2C according to the fourth embodiment.

As shown in FIG. 12, with the playback system 2C according to the fourth embodiment, when the playback device 4C is turned on for the first time after its purchase, for example, a processor 32C of the playback device 4C generates an image signal of a confirmation screen prompting the user to connect the HDMI cable 8 to the HDMI terminals 12, 14, and 16 of the display device 6 in that order.

Every time the HDMI cable 8 is connected to each of the HDMI terminals 12, 14, and 16 of the display device 6, an acquisition component 28C of the playback device 4C acquires EDID information from the display device 6. The acquisition component 28C generates correspondence information based on the acquired sets of EDID information, and stores the generated correspondence information in the storage component 30C. The acquisition component 28C and the processor 32C constitute an electric controller 37C. In the illustrated embodiment, the controller 37C is formed by a processor or microcomputer. Thus, in the illustrated embodiment the controller 37C sequentially transmits the image signals for prompting the user to sequentially connect the HDMI cable 8 (an example of a video cable) between the playback device 4C and the display device 6 to the HDMI terminals 12, 14 and 16 (an example of communication terminals) to acquire the EDID information (an example of setting information).

4-2. Operation of Playback System

Figure 13:
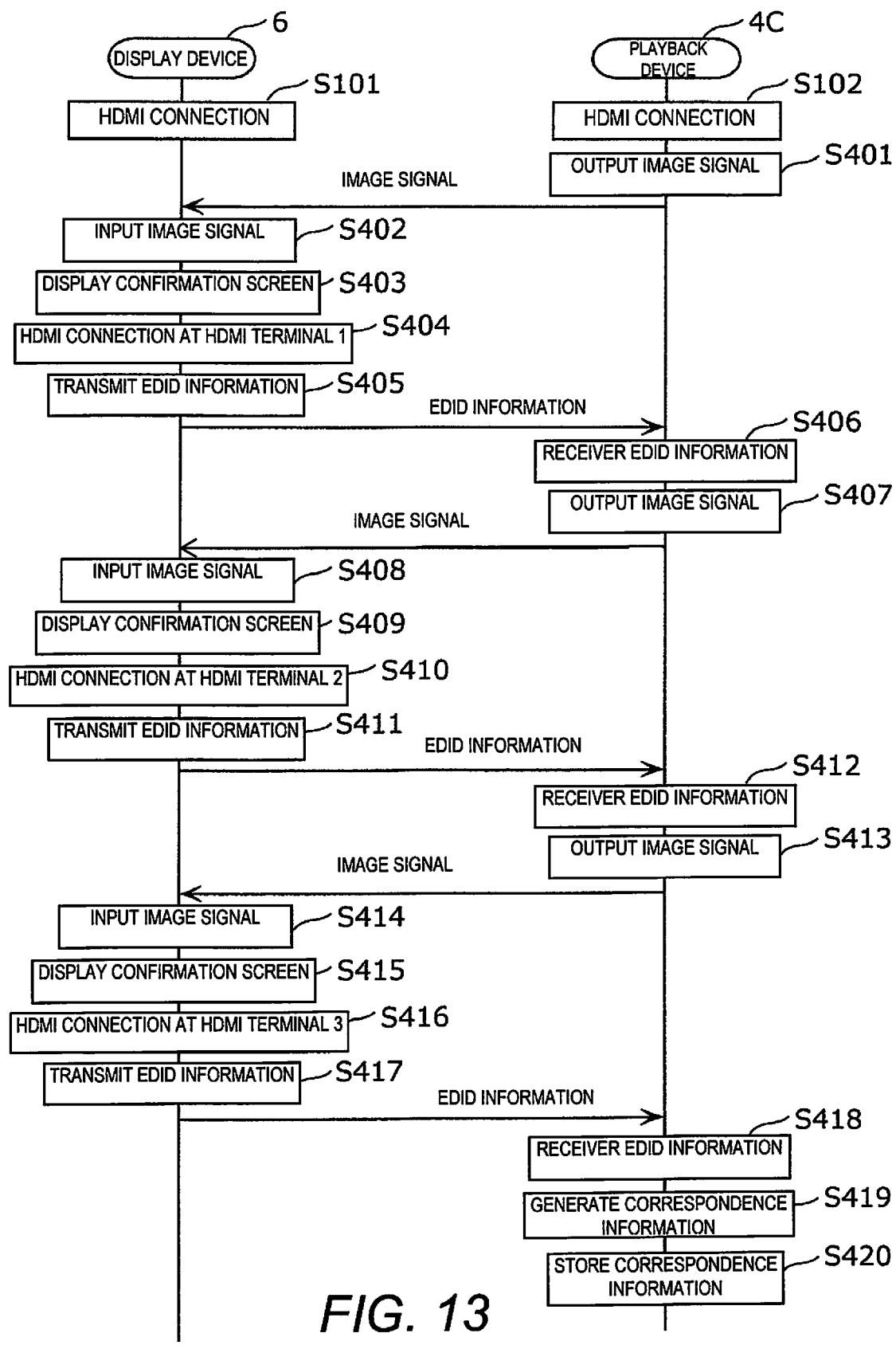
FIG. 13 is a sequence diagram showing the operation of the playback system according to the fourth embodiment.
Figure 14:
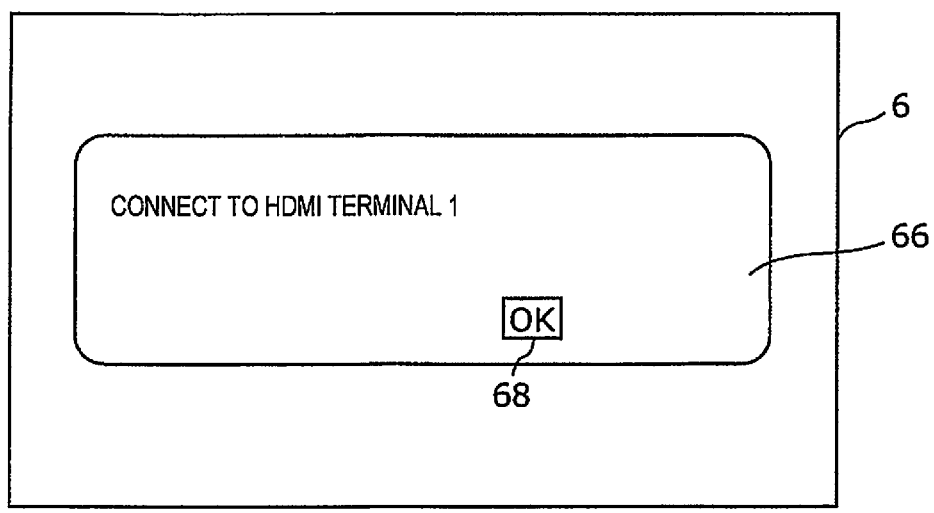
FIG. 14 is a diagram showing a display example of a confirmation screen according to the fourth embodiment.

The operation of the playback system 2C according to the fourth embodiment will now be described through reference to FIGS. 13 and 14. FIG. 13 is a sequence diagram showing the operation of the playback system 2C according to the fourth embodiment. FIG. 14 is a diagram showing a display example of a confirmation screen 66 according to the fourth embodiment.

As shown in FIG. 13, first, steps S101 and S102 are executed as in the first embodiment. After this, the processor 32C of the playback device 4C generates the image signal of the confirmation screen prompting the user to connect the HDMI cable 8 to the HDMI terminal 12 of the display device 6. The communication component 26 of the playback device 4C transmits (outputs) the image signal generated by the processor 32C to the display device 6 (S401).

The communication component 38 of the display device 6 receives (inputs) the image signal from the playback device 4C (S 402). The controller 40 of the display device 6 causes the display device 6 to display the confirmation screen based on the image signal (S402).

A display example of the confirmation screen in step S402 will now be described. As shown in FIG. 14, the confirmation screen 66 displays a message prompting the user to connect the HDMI cable 8 to the "HDMI terminal 1" (HDMI terminal 12) of the display device 6, such as "Connect to HDMI terminal 1." The user connects the HDMI cable 8 to the HDMI terminal 12 of the display device 6 (S404), and operates the remote control of the display device 6 or the like to select the OK button 68.

The communication component 38 of the display device 6 transmits the EDID information to the playback device 4C (S405). This EDID information includes information indicating the corresponding brightness range (compatibility/incompatibility of HDR) at the HDMI terminal 12 of the display device 6, and the like. The communication component 26 of the playback device 4C receives the EDID information from the display device 6 (S406). The acquisition component 28C of the playback device 4C acquires the EDID information via the communication component 26.

After this, the processor 32C of the playback device 4C generates the image signal of the confirmation screen prompting the user to connect the HDMI cable 8 to the HDMI terminal 14 of the display device 6. The communication component 26 of the playback device 4C transmits (outputs) the image signal generated by the processor 32C to the display device 6 (S407). The communication component 38 of the display device 6 receives (inputs) the image signal from the playback device 4C (S408). The controller 40 of the display device 6 causes the display device 6 to display the confirmation screen based on the image signal (S409). Although not depicted, this confirmation screen displays a message prompting the user to connect the HDMI cable 8 to the "HDMI terminal 2" (HDMI terminal 14) of the display device 6, such as "Connect to the HDMI terminal 2." The user connects the HDMI cable 8 to the HDMI terminal 14 of the display device 6 (S410), and operates the remote control of the display device 6B or the like to select the OK button.

The communication component 38 of the display device 6 transmits the EDID information to the playback device 4C (S411). The EDID information includes information indicating the corresponding brightness range of the HDMI terminal 14 of the display device 6 and the like. The communication component 26 of the playback device 4C receives the EDID information from the display device 6 (S412). The acquisition component 28C of the playback device 4C acquires the EDID information via the communication component 26.

After this, the processor 32C of the playback device 4C generates the image signal of the confirmation screen for prompting the user to connect the HDMI cable 8 to the HDMI terminal 16 of the display device 6. The communication component 26 of the playback device 4C transmits (outputs) the image signal generated by the processor 32C to the display device 6 (S413). The communication component 38 of the display device 6 receives (inputs) the image signal from the playback device 4C (S414). The controller 40 of the display device 6 causes the display device 6 to display the confirmation screen based on the image signal (S415). Although not depicted, this confirmation screen displays a message prompting the user to connect the HDMI cable 8 to the "HDMI terminal 3" (HDMI terminal 16) of the display device 6, such as "Connect to the HDMI terminal 3." The user connects the HDMI cable 8 to the HDMI terminal 16 of the display device 6 (S416), and operates the remote control of the display device 6B or the like to select the OK button.

The communication component 38 of the display device 6 transmits the EDID information to the playback device 4C (S417). The EDID information includes information indicating the corresponding brightness range of the HDMI terminal 16 of the display device 6, and the like. The communication component 26 of the playback device 4C receives the EDID information from the display device 6 (S418). The acquisition component 28C of the playback device 4C acquires the EDID information via the communication component 26.

The acquisition component 28C of the playback device 4C generates the correspondence information based on the sets of the EDID information received in steps S406, S412, and S418 (S419). That is, this correspondence information includes information indicating the corresponding brightness range at each of the HDMI terminals 12, 14, and 16 of the display device 6. The acquisition component 28C causes the storage component 30C to store the generated correspondence information.

4-3. Effect

As described above, when the playback device 4C is turned on for the first time after its purchase, for example, the user connects the playback device 4C to each of the HDMI terminals 12, 14, and 16, in that order, allowing the correspondence information to be generated based on the EDID information acquired upon every connection. Consequently, there is no need to include software exclusive to the playback system 2C in the display device 6, and this makes the display device 6 more versatile.

Fifth Embodiment 5-1. Configuration of Playback System

Figure 15:
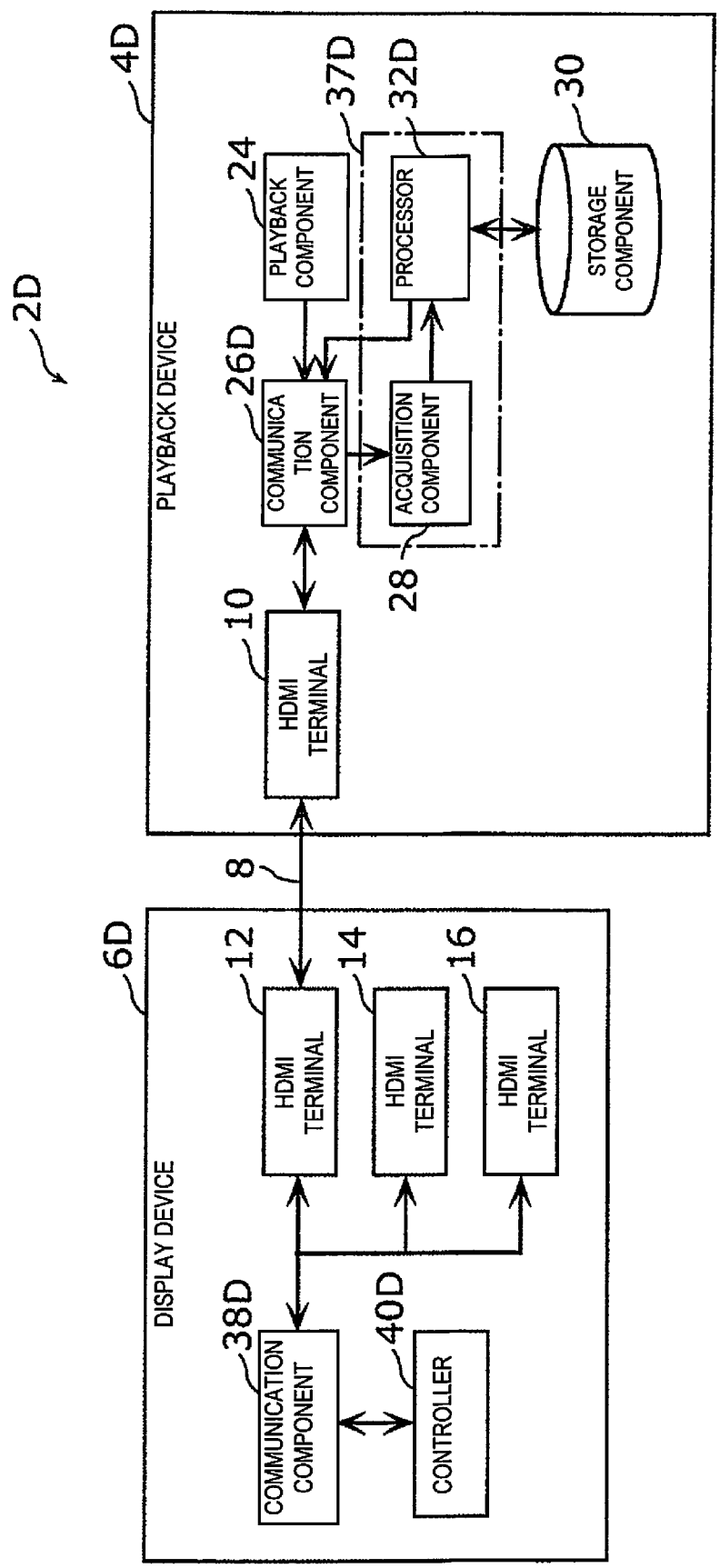
FIG. 15 is a block diagram of the configuration of a playback system according to a fifth embodiment.

The configuration of a playback system 2D according to a fifth embodiment will now be described through reference to FIG. 15. FIG. 15 is a block diagram of the configuration of the playback system 2D according to the fifth embodiment.

As shown in FIG. 15, with the playback system 2D according to the fifth embodiment, a communication component 26D of a playback device 4D is a CEC communication interface that transmits and receives CEC commands to and from the display device 6D. A communication component 38D of a display device 6D is a CEC communication interface that transmits and receives CEC commands to and from the playback device 4D.

Correspondence information is stored in advance in the storage component 30 of the playback device 4D, just as in the first embodiment. A processor 32D of the playback device 4D generates an instruction signal, which is a CEC command for instructing the display device 6D to change the setting of the brightness range from SDR to HDR based on the correspondence information stored in the storage component 30. The instruction signal indicates setting method information indicating how to set the brightness range (such as "Menu>Setup>TV Settings>HDMI mode"), which is included in the correspondence information, as instruction information (an example of information related to a setting changing to a specific brightness range). The acquisition component 28 and the processor 32D constitute an electric controller 37D. In the illustrated embodiment, the controller 37D is formed by a processor or microcomputer.

An electric controller 40D of the display device 6D executes processing to change the setting of the brightness range from SDR to HDR based on the instruction signal from the playback device 4D. In the illustrated embodiment, the controller 40D is formed by a processor or microcomputer.

5-2. Operation of Playback System

Figure 16:
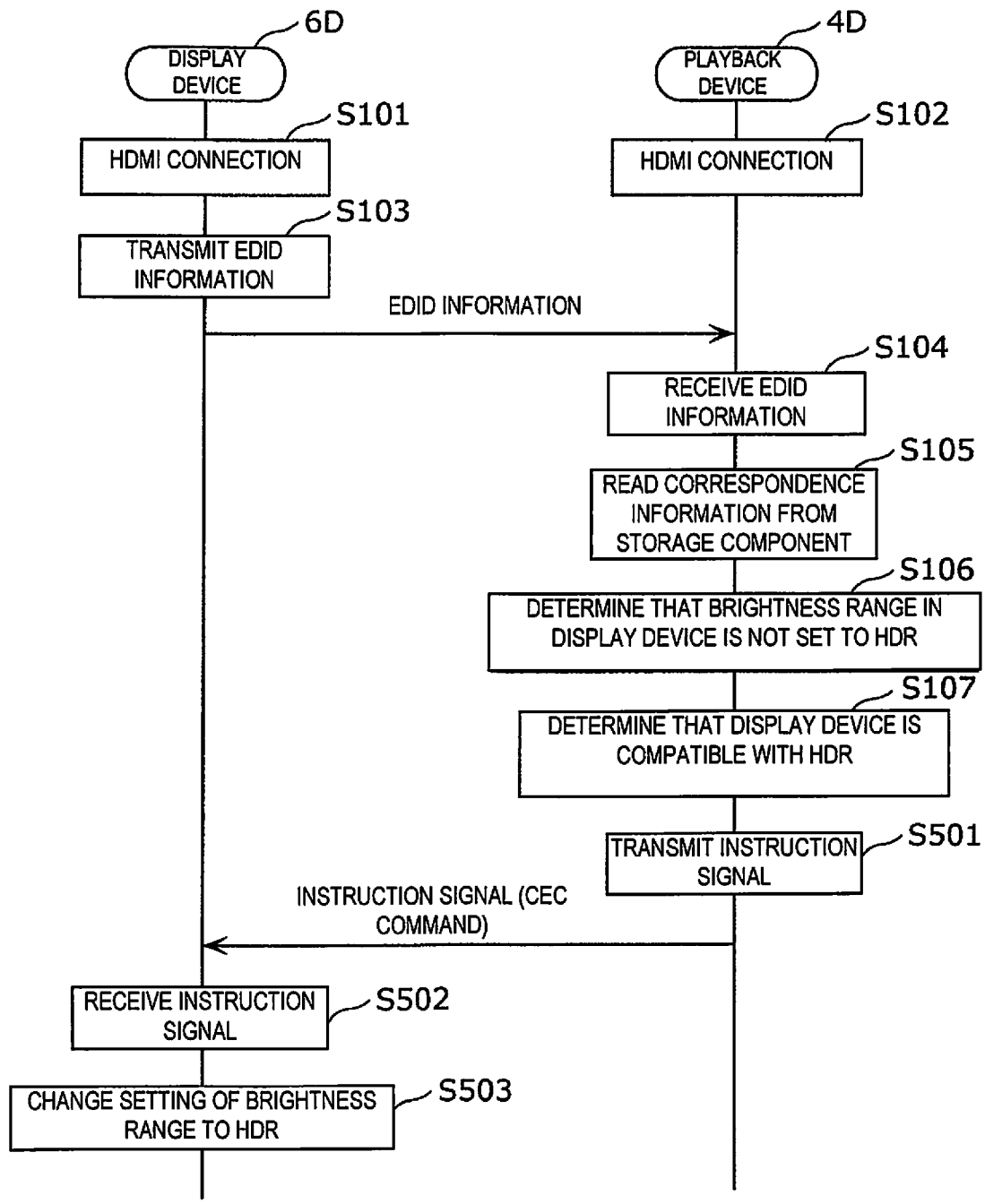
FIG. 16 is a sequence diagram showing the operation of the playback system according to the fifth embodiment.

The operation of the playback system 2D according to the fifth embodiment will now be described through reference to FIG. 16. FIG. 16 is a sequence diagram showing the operation of the playback system 2D according to the fifth embodiment.

As shown in FIG. 16, first, steps S101 to S107 are executed as in the first embodiment. After this, the processor 32D of the playback device 4D generates the instruction signal, which is the CEC command, and the communication component 26D of the playback device 4D transmits the instruction signal generated by the processor 32D to the display device 6D (S501). That is, the processor 32D transmits the generated instruction signal to the display device 6D via the communication component 26D.

The communication component 38D of the display device 6D receives the instruction signal from the playback device 4D (S502), and outputs the received instruction signal to the controller 40D. The controller 40D of the display device 6D executes processing to change the setting of the brightness range from SDR to HDR based on the instruction signal (S503).

5-3. Effect

The instruction signal for instructing the display device 6D to change the setting of the brightness range from SDR to HDR is transmitted to the display device 6D, which allows the brightness range to be automatically changed from SDR to HDR in the display device 6D. This makes the device more convenient for the user. This embodiment and the third embodiment above can also be combined.

Modification Examples

The playback devices according to the first to fifth embodiments of the present invention are described above, but the present invention is not limited to or by the first to fifth embodiments. For example, the above embodiments can be combined with each other.

In the above embodiments, the image signal for displaying the confirmation screen on the display device 6 (6B) is transmitted from the playback device 4 (4A, 4B, 4C) to the display device 6 (6B), but this is not the only option. For example, a sound signal for causing a confirmation sound to be outputted from the display device 6 (6B) can be transmitted from the playback device 4 (4A, 4B, 4C) to the display device 6 (6B). In this case, the confirmation sound is a voice message for providing the user with information related to the setting change to the HDR. This confirmation sound is a voice message or the like prompting the user to change the connection of the HDMI cable 8, such as "Connect to HDMI terminal 1 or HDMI terminal 2. If already connected, select OK."

Each of the above devices can be specifically configured as a computer system made up of a microprocessor, a ROM (read only memory), a RAM (random access memory), a hard disk drive, a display component, a keyboard, a mouse, etc. A computer program is stored in the RAM or on the hard disk drive. When the microprocessor operates according to the computer program, the various devices perform their functions. Here, the computer program is constituted by combining a plurality of instruction codes indicating instructions to the computer in order to achieve specific functions.

Furthermore, some or all of the constituent elements that make up the above devices can be constituted by a single system LSI (large-scale integrated circuit). The system LSI is a super multifunctional LSI manufactured by integrating a plurality of constituent parts on one chip. More specifically, it is a computer system configured to include a microprocessor, a ROM, a RAM, and so forth. A computer program is stored in the RAM. The microprocessor operates according to a computer program so that the system LSI achieves its functions.

In addition, some or all of the constituent elements that make up the above devices can be constituted by a single module or an IC card that can be inserted into and removed from each device. This IC card or module is a computer system composed of a microprocessor, a ROM, a RAM, and so forth. The IC card or module can include a super multifunction LSI. When the microprocessor operates according to the computer program, the IC card or the module achieves its functions. This IC card or module can be tamper resistant.

The present invention can also be the above-mentioned methods. The present invention can also be a computer program with which these methods are carried out by a computer, or can be a digital signal composed of the above computer program.

The present invention can also be the result of recording the above-mentioned computer program or the above-mentioned digital signal to a computer-readable non-transitory recording medium such as a flexible disk, a hard disk, a CD-ROM, an MO, a DVD, a DVD-ROM, a DVD-RAM, a BD, or a semiconductor memory. Alternatively, it can be the above-mentioned digital signal recorded to one of these non-transitory recording media.

The present invention can also be used to transmit the above-mentioned computer program or the above-mentioned digital signal via an electric communication line, a wireless or wired communication line, a network such as the Internet, a data broadcast, or the like.

The present invention can also be a computer system comprising a microprocessor and a memory, wherein the memory stores the above-mentioned computer program, and the microprocessor operates according to this computer program.

In addition, the present invention can be worked as another, independent computer system by recording and transferring the above-mentioned program or the above-mentioned digital signal to the above-mentioned non-transitory recording medium, or by transferring the above-mentioned program or the above-mentioned digital signal via the above-mentioned network or the like.

In the above embodiments, the constituent elements can be configured by dedicated hardware, or can be realized by executing a software program suited to each constituent element. Each constituent element can be realized by having a CPU, a processor, or another such program execution component read and execute a software program recorded to a recording medium such as a hard disk or a semiconductor memory.

The playback device of the present invention can be applied as a digital video player or the like for playing back video content stored on a DVD or a BD, for example.

[1] In view of the state of the known technology and in accordance with an aspect of the present invention, a playback device is configured to be connected to a display device. The playback device comprises a communication component and a controller. The communication component is configured to communicate with the display device. The controller is configured to acquire setting information indicating a current setting of a brightness range in the display device from the display device via the communication component. While a specific brightness range has not been set in the display device, the controller is configured to transmit information related to a setting change to the specific brightness range via the communication component to the display device based on correspondence information indicating a correspondence relationship between the display device and the brightness range that is settable in the display device.

With this aspect, when the display device has not been set to the specific brightness range, the information related to the setting changing to the specific brightness range is transmitted to the display device based on the correspondence information. Thus, the user can be provided with the information related to the setting change to the specific brightness range. Consequently, the user can change the setting of the display device to the specific brightness range based on the provided information, for example.

[2] In accordance with a preferred embodiment according to the playback device mentioned above, the playback device further comprises a storage component configured to store the correspondence information in advance.

With this aspect, the correspondence information can be stored in advance in the playback device. This allows the correspondence information to be read from the storage component in a relatively short time.

[3] In accordance with a preferred embodiment according to any one of the playback devices mentioned above, the playback device further comprises a receiver configured to receive update information for updating the correspondence information from an external device. The external device is configured to be connected to the playback device via a network and is configured to hold the update information. The controller is further configured to update the correspondence information based on the received update information.

With this aspect, it is possible to update the correspondence information based on the update information from the external device.

[4] In accordance with a preferred embodiment according to any one of the playback devices mentioned above, the playback device further comprises a transceiver configured to transmit to an external device a request signal for requesting that the external device transmit the correspondence information, and configured to receive the correspondence information transmitted from the external device based on the request signal. The external device is configured to be connected to the playback device via a network and is configured to hold the correspondence information.

With this aspect, since the correspondence information is held in the external device, there is no need to store the correspondence information in the playback device in advance. Thus, less storage space in the playback device is taken up. Also, the update processing for the correspondence information can be easily executed in the external device.

[5] In accordance with a preferred embodiment according to any one of the playback devices mentioned above, the correspondence information includes information indicating correspondence relationships between a plurality of types of display devices and brightness ranges that are settable in the display devices.

With this aspect, versatility of the correspondence information can be enhanced by having the correspondence information include information related to the display devices made by various companies, for example.

[6] In accordance with a preferred embodiment according to any one of the playback devices mentioned above, the controller is further configured to transmit to the display device, via the communication component, a request signal for requesting that the display device transmit the correspondence information, and configured to receive, via the communication component, the correspondence information transmitted from the display device based on the request signal.

With this aspect, since the correspondence information is held in the display device, there is no need to store the correspondence information in the playback device in advance. Thus, less storage space in the playback device is taken up.

[7] In accordance with a preferred embodiment according to any one of the playback devices mentioned above, the display device includes a plurality of connection terminals for connecting with the playback device. The controller is further configured to acquire the setting information every time the playback device is connected to one of the connection terminals, and configured to generate the correspondence information based on a plurality of pieces of the acquired setting information.

With this aspect, when the playback device is turned on for the first time after purchase, the user sequentially connects the playback device to the plurality of the connection terminals in order, which allows the correspondence information to be generated based on the plurality of pieces of the setting information acquired every time a connection is made.

[8] In accordance with a preferred embodiment according to any one of the playback devices mentioned above, the correspondence information includes setting method information indicating a setting method to the specific brightness range in the display device. The controller is further configured to transmit to the display device, via the communication component, instruction information for instructing the display device on the setting change to the specific brightness range based on the setting method information.

With this aspect, since the instruction information for instructing the display device on the setting change to the specific brightness range is transmitted to the display device, the setting can be changed automatically to the specific brightness range in the display device. This makes the playback device more convenient to use for the user.

[9] In accordance with a preferred embodiment according to any one of the playback devices mentioned above, the setting information is EDID (extended display identification data) information, and the specific brightness range is HDR (high dynamic range).

[10] In accordance with a preferred embodiment according to any one of the playback devices mentioned above, the controller is further configured to determine whether the specific brightness has been set in the display device based on the acquired setting information.

[11] In accordance with a preferred embodiment according to any one of the playback devices mentioned above, the correspondence information further indicates a correspondence relationship between each connection terminal of the display device and the brightness range that is settable for the connection terminal.

[12] In accordance with a preferred embodiment according to any one of the playback devices mentioned above, the controller is further configured to transmit message signal for prompting a user to change a connection between the playback device and the display device or to change the current setting of the brightness range in the display device as the information related to the setting change to the specific brightness range.

[13] In accordance with a preferred embodiment according to any one of the playback devices mentioned above, the controller is further configured to transmit image signal for indicating a connection terminal of the display device that is compatible to the specific brightness range as the message signal.

[14] In accordance with a preferred embodiment according to any one of the playback devices mentioned above, the controller is further configured to transmit image signal for indicating a path from a main menu screen to a sub menu screen for changing the current setting of the brightness range in the display device to the specific brightness range as the message signal.

[15] In accordance with a preferred embodiment according to any one of the playback devices mentioned above, the controller is further configured to transmit image signal for displaying a message on the display device as the message signal.

[16] In accordance with a preferred embodiment according to any one of the playback devices mentioned above, the receiver is configured to periodically receive the update information from the external device.

[17] In accordance with a preferred embodiment according to any one of the playback devices mentioned above, the update information includes a correspondence relationship between an additional display device and the brightness range that is settable in the additional display device.

[18] In accordance with a preferred embodiment according to any one of the playback devices mentioned above, the controller is further configured to transmit the request signal to the display device using a CEC (Consumer Electronics Control) communication, and configured to receive the correspondence information from the display device using the CEC communication.

[19] In accordance with a preferred embodiment according to any one of the playback devices mentioned above, the controller is further configured to sequentially transmit image signals for prompting a user to sequentially connect a video cable between the playback device and the display device to the communication terminals to acquire the setting information.

[20] In accordance with a preferred embodiment according to any one of the playback devices mentioned above, the setting method information indicates a path from a main menu screen to a sub menu screen for setting the brightness range in the display device.

The present invention can also be realized as a program for causing a computer to function as a characteristic processing unit included in a playback device, or as a program for causing a computer to execute characteristic steps included in a playback method. It goes without saying that such a program can be distributed via a computer readable non-transitory recording medium such as a CD-ROM (compact disk-read only memory) or a communication network such as the Internet.

With the playback device according to one aspect of the present invention, a user can be provided with information related to a setting change to a specific brightness range.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

While only selected embodiments have been chosen to illustrate the present invention, it will be apparent to those skilled in the field of playback devices from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A playback device configured to be connected to a display device, the playback device comprising:
   a communication component that communicates with the display device; and
   a controller that acquires setting information indicating a current setting of a brightness range in the display device from the display device via the communication component,
   in response to the controller determining that the display device is not being set to a specific brightness range based on the setting information that has been acquired, the controller determining whether the display device is settable to the specific brightness range based on correspondence information indicating a correspondence relationship between the display device and the brightness range that is settable in the display device, and
   in response to the controller determining that the display device is settable to the specific brightness range, the controller transmitting information related to a setting change for setting the display device to the specific brightness range via the communication component to the display device.

2. The playback device according to claim 1, further comprising
   a storage component that stores the correspondence information in advance.

3. The playback device according to claim 2, further comprising
   a receiver that receives update information for updating the correspondence information from an external device that is configured to be connected to the playback device via a network and is configured to hold the update information,
   the controller updating the correspondence information based on the received update information.

4. The playback device according to claim 3, wherein
   the receiver periodically receives the update information from the external device.

5. The playback device according to claim 3, wherein
   the update information includes a correspondence relationship between an additional display device and the brightness range that is settable in the additional display device.

6. The playback device according to claim 1, further comprising
   a transceiver that transmits to an external device that is configured to be connected to the playback device via a network and is configured to hold the correspondence information a request signal for requesting that the external device transmit the correspondence information, and receives the correspondence information transmitted from the external device based on the request signal.

7. The playback device according to claim 1, wherein
   the correspondence information includes information indicating correspondence relationships between a plurality of types of display devices and brightness ranges that are settable in the display devices.

8. The playback device according to claim 1, wherein
   the controller transmits to the display device, via the communication component, a request signal for requesting that the display device transmit the correspondence information, and receives, via the communication component, the correspondence information transmitted from the display device based on the request signal.

9. The playback device according to claim 8, wherein
   the controller transmits the request signal to the display device using a CEC (Consumer Electronics Control) communication, and receives the correspondence information from the display device using the CEC communication.

10. The playback device according to claim 1, wherein
    the display device includes a plurality of connection terminals for connecting with the playback device, and
    the controller acquires the setting information every time the playback device is connected to one of the connection terminals, and generates the correspondence information based on a plurality of pieces of the acquired setting information.

11. The playback device according to claim 1, wherein
    the correspondence information includes setting method information indicating a setting method to the specific brightness range in the display device, and
    the controller transmits to the display device, via the communication component, instruction information for instructing the display device on the setting change to the specific brightness range based on the setting method information.

12. The playback device according to claim 11, wherein the setting method information indicates a path from a main menu screen to a sub menu screen for setting the brightness range in the display device.

13. The playback device according to claim 1, wherein
the setting information is EDID (extended display identification data) information, and
the specific brightness range is HDR (high dynamic range).

14. The playback device according to claim 1, wherein the controller determines whether the specific brightness has been set in the display device based on the acquired setting information.

15. The playback device according to claim 1, wherein the correspondence information further indicates a correspondence relationship between each connection terminal of the display device and the brightness range that is settable for the connection terminal.

16. The playback device according to claim 1, wherein the controller transmits message signal for prompting a user to change a connection between the playback device and the display device or to change the current setting of the brightness range in the display device as the information related to the setting change to the specific brightness range.

17. The playback device according to claim 16, wherein the controller transmits image signal for indicating a path from a main menu screen to a sub menu screen for changing the current setting of the brightness range in the display device to the specific brightness range as the message signal.

18. The playback device according to claim 16, wherein the controller transmits image signal for displaying a message on the display device as the message signal.

19. A playback device configured to be connected to a display device, the playback device comprising:
a communication component that communicates with the display device; and
a controller that acquires setting information indicating a current setting of a brightness range in the display device from the display device via the communication component,
while a specific brightness range has not been set in the display device, the controller transmitting information related to a setting change to the specific brightness range via the communication component to the display device based on correspondence information indicating a correspondence relationship between the display device and the brightness range that is settable in the display device,
the controller transmitting message signal for prompting a user to change a connection between the playback device and the display device or to change the current setting of the brightness range in the display device as the information related to the setting change to the specific brightness range, and
the controller transmitting image signal for indicating a connection terminal of the display device that is compatible to the specific brightness range as the message signal.

20. A playback device configured to be connected to a display device, the playback device comprising:
a communication component that communicates with the display device; and
a controller that acquires setting information indicating a current setting of a brightness range in the display device from the display device via the communication component,
while a specific brightness range has not been set in the display device, the controller transmitting information related to a setting change to the specific brightness range via the communication component to the display device based on correspondence information indicating a correspondence relationship between the display device and the brightness range that is settable in the display device,
the display device including a plurality of connection terminals for connecting with the playback device,
the controller acquiring the setting information every time the playback device is connected to one of the connection terminals, and generating the correspondence information based on a plurality of pieces of the acquired setting information, and
the controller sequentially transmitting image signals for prompting a user to sequentially connect a video cable between the playback device and the display device to the communication terminals to acquire the setting information.

* * * * *